(12) United States Patent
Treuhaft et al.

(10) Patent No.: US 8,676,989 B2
(45) Date of Patent: Mar. 18, 2014

(54) ROBUST DOMAIN NAME RESOLUTION

(75) Inventors: Noah Treuhaft, Oakland, CA (US);
David Ulevitch, San Francisco, CA (US); Michael Damm, San Francisco, CA (US)

(73) Assignee: OpenDNS, Inc., San Francisco, CA (US)

( * ) Notice: Subject to any disclaimer, the term of this patent is extended or adjusted under 35 U.S.C. 154(b) by 757 days.

(21) Appl. No.: 12/723,447

(22) Filed: Mar. 12, 2010

(65) Prior Publication Data

US 2010/0274970 A1 Oct. 28, 2010

Related U.S. Application Data

(60) Provisional application No. 61/172,162, filed on Apr. 23, 2009.

(51) Int. Cl.
*G06F 15/16* (2006.01)

(52) U.S. Cl.
USPC .......................................... 709/227; 709/228

(58) Field of Classification Search
USPC ................................................ 709/227, 228
See application file for complete search history.

(56) References Cited

U.S. PATENT DOCUMENTS

| | | | |
|---|---|---|---|
| 6,553,413 B1 | 4/2003 | Lewin et al. | |
| 6,760,746 B1 | 7/2004 | Schneider | |
| 7,003,555 B1 | 2/2006 | Jungck | |
| 7,103,645 B2 | 9/2006 | Leighton et al. | |
| 7,152,118 B2 | 12/2006 | Anderson, IV et al. | |
| 7,225,272 B2 | 5/2007 | Kelley et al. | |
| 2002/0010798 A1 | 1/2002 | Ben-Shaul et al. | |
| 2002/0027915 A1 | 3/2002 | Foti et al. | |
| 2003/0182447 A1 | 9/2003 | Schilling | |
| 2004/0039798 A1 | 2/2004 | Hotz et al. | |
| 2004/0215707 A1 | 10/2004 | Fujita et al. | |
| 2005/0198386 A1 | 9/2005 | Accapadi et al. | |
| 2005/0204039 A1* | 9/2005 | Douglis et al. | 709/225 |
| 2006/0036720 A1* | 2/2006 | Faulk, Jr. | 709/223 |
| 2006/0059337 A1 | 3/2006 | Poyhonen et al. | |
| 2007/0165542 A1 | 7/2007 | Shin et al. | |

(Continued)

OTHER PUBLICATIONS

"Mitigating DNS DoS Attacks;" Ballani, Hitesh; Francis, Paul; CCS'08, Oct. 27-31, 2008, Alexandria, Virginia, USA.; accessed < http://research.microsoft.com/en-us/um/people/hiballan/pubs/ccs08-staledns.pdf>, whole document.*

(Continued)

*Primary Examiner* — Thomas Dailey
(74) *Attorney, Agent, or Firm* — Vierra Magen Marcus LLP

(57) ABSTRACT

A recursive DNS nameserver system and related domain name resolution techniques are disclosed. The DNS nameservers utilize a local cache having previously retrieved domain name resolution to avoid recursive resolution processes and the attendant DNS requests. If a matching record is found with a valid (not expired) TTL field, the nameserver returns the cached domain name information to the client. If the TTL for the record in the cache has expired and the nameserver is unable to resolve the domain name information using DNS requests to authoritative servers, the recursive DNS nameserver returns to the cache and accesses the resource record having an expired TTL. The nameserver generates a DNS response to the client device that includes the domain name information from the cached resource record. In various embodiments, subscriber information is utilized to resolve the requested domain name information in accordance with user-defined preferences.

20 Claims, 9 Drawing Sheets

(56) References Cited

U.S. PATENT DOCUMENTS

| | | |
|---|---|---|
| 2007/0294419 A1 | 12/2007 | Ulevitch |
| 2009/0070453 A1* | 3/2009 | Douglis et al. ............... 709/223 |
| 2009/0177798 A1* | 7/2009 | Bogner ........................ 709/245 |
| 2009/0222584 A1* | 9/2009 | Josefsberg et al. ........... 709/245 |
| 2010/0106833 A1* | 4/2010 | Banerjee et al. .............. 709/226 |

OTHER PUBLICATIONS

Godin, Seth, "Oopstr," Article on "seth godin's blog" at http://sethgodin:typepad.com/seths_blog/2006/05/00-str.html, downloaded from the Internet on Jun. 14, 2006 and indicated as posted on May 28, 2006, 3 pages.

Notice of Allowance dated Aug. 5, 2013, U.S. Appl. No. 11/424,230, filed Jun. 14, 2006.

* cited by examiner

ROBUST DOMAIN NAME RESOLUTION

CLAIM OF PRIORITY

The present application claims priority from U.S. Provisional Patent Application No. 61/172,162, entitled "Robust Domain Name Resolution," by Treuhaft, et al., filed Apr. 23, 2009, incorporated by reference herein in its entirety.

BACKGROUND OF THE INVENTION

1. Field of the Invention

Embodiments in accordance with the present disclosure relate to computer networks, and particularly to processing domain name system (DNS) information.

2. Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

While early network implementations could utilize a single periodically distributed ASCII file to translate between domain names and IP addresses, modern networks such as the Internet rely on the domain name system (DNS) for the resolution of names and addresses. FIG. 1 is a simplified block diagram illustrating traditional DNS processing. A client computing device 102 includes a resolver 104 for initiating DNS requests. The resolver may be a stand alone component such as a software module of the client, or may be embedded within various applications such as web browsers, file transfer protocol programs, email applications, and the like that utilize Internet resources. When the client requests an Internet resource such as a web page or delivery of an email message, the resolver is charged with determining the IP address(es) of the requested resource so that the appropriate request can be issued to the appropriate address. The resolver is configured with the addresses of the group of ISP DNS Nameservers 110 that handle recursive DNS processing for the client device. As is often the case, the group of nameservers is provided by the Internet Service Provider (ISP) for the client device, although this isn't required. Nameservers 110 are recursive nameservers which resolve DNS requests using a recursive process that accesses various other nameservers in order to satisfy a given query.

Consider an example DNS request 150 from client 102 to nameserver 112 for the domain name information of "www.opendns.com". The ISP DNS nameserver first checks a local cache to attempt to resolve the request. The ISP DNS nameserver maintains the local cache with domain name records that have already been resolved to improve performance in responding to subsequent DNS requests. If nameserver 112 is maintaining the requested domain name in the local cache, it will issue a DNS response 152 to the client with the domain name record including the IP address of "www.opendns.com".

If the ISP DNS nameserver 112 does not have an entry for the requested domain name, it will launch recursive processing using authoritative DNS nameservers 120 and/or root DNS nameservers 130. An authoritative nameserver maintains an authoritative or master list for a zone which is a group of computing devices. Recursive DNS nameservers obtain domain name information such as the IP address of a requested resource from authoritative nameservers. The root DNS nameservers are also authoritative DNS nameservers. They are called root DNS nameservers because they contain the authoritative domain name information for a set of top level domains (TLDs) in the so-called root zone. For example the root DNS nameservers contain the IP addresses for finding domain name information for lower level domains in the top level domains. The top level domains include the generic top-level domains (gTLD) of .com, .org, .net, etc.

Nameserver 112 first issues a DNS request 154 to root DNS nameservers 130. The root DNS nameservers 130 can include multiple nameservers, one or more of which can be issued a request for the needed information. One of the nameservers 132 responds with a DNS response 156 including the IP address of one or more authoritative name servers for the ".com" domain. When ISP DNS nameserver 112 obtains the IP address for the ".com" domain, it issues another DNS request 158 to the specified one of the authoritative DNS nameservers 120. The specified authoritative nameserver will issue a DNS response 160 with the IP address of one or more nameservers for the "opendns.com" domain. This process repeats between the ISP DNS nameserver and the authoritative name servers 120 until the ISP DNS nameserver receives the IP address for "www.opendns.com". The client 102 application can then issue the resource request to the appropriate computer, such as an HTTP request to the server at the corresponding IP address.

FIG. 2 is a simplified block diagram of a typical authoritative DNS nameserver 120 as shown in FIG. 1 that can store domain name records. In this example, the authoritative DNS nameserver 120 is a computer system with a processor 150 coupled to a communications interface 160 and a memory or storage 170 via a system bus 152. The communications interface 160 exchanges data with a communications network, such as the Internet, via line 154. The processor 150 receives DNS requests from the Internet and resolves the DNS requests based on domain name records, such as a DNS record 180 stored in memory 170. The DNS record 180 includes a domain name 182, which is used as a key to lookup a corresponding IP address 184, and includes a time-to-live (TTL) value 186. The TTL value for the DNS record can be set by the administrator of the authoritative DNS nameserver. The TTL value is provided as part of the DNS response to DNS requests and is used by the receiving nameservers to control how long the DNS record should be maintained and treated as valid. In accordance with the DNS protocol, the receiving nameservers are to invalidate any cached records having an expired TTL value. In this manner, the administrator of an authoritative server can control how long recursive nameservers will utilize an old record before checking back with the authoritative server to obtain fresh data for the DNS record.

Although DNS record caching by recursive DNS nameservers can reduce network traffic and improve DNS response performance, there remains room for improvement to provide better resolution processes for the domain name system.

SUMMARY OF THE INVENTION

Embodiments in accordance with the presently disclosed technology provide improved domain name resolution techniques in computing networks. One or more recursive DNS nameservers are configured to receive DNS requests from client devices for domain name information and resolve the requests into one or more IP addresses. The DNS nameservers utilize a local cache having previously retrieved domain name information to respond to DNS requests. The nameserver checks the local cache for a resource record corresponding to the requested domain name. If there is no matching entry in the cache, the nameserver initiates a recursive resolution process to retrieve the requested information. If a matching record is found with a valid (not expired) TTL field, the nameserver returns the cached domain name information to the client. If the TTL for the record in the cache has expired and the nameserver is unable to resolve the domain name information using DNS requests to authoritative servers, the recursive DNS nameserver returns to the cache and accesses the resource record having an expired TTL. The nameserver will generate a DNS response to the client device that includes the domain name information from the cached resource record even though the record contains an expired TTL field. In various embodiments, subscriber information is utilized to resolve the requested domain name information in accordance with user-defined preferences. Additional caching techniques are provided to maintain resource records with expired TTL records, and particularly those corresponding to identified anomalies.

A method of processing domain name system requests in one embodiment includes receiving at a recursive nameserver a request from a client for domain name information associated with a domain name and determining whether a local cache contains a domain name record corresponding to the domain name. If the local cache contains the domain name record corresponding to the domain name, whether the domain name record is expired is determined and in response to determining that the domain name record is expired, issuing one or more requests for the domain name information to one or more authoritative name servers. If the domain name information is not received from the one or more name nameservers, a DNS response is transmitted to the client that includes information from the expired domain name record.

A system for processing domain name system requests in one embodiment includes a communications interface configured to exchange data with a communications network, a local cache configured to store domain name information for domain names, and one or more processors in communication with the communications interface and the local cache. The one or more processors are configured to process a request for domain name information associated with a domain name by determining whether the local cache contains the requested domain name information in a domain name record, generating and transmitting a DNS response to the client with information from the domain name record in the local cache if a TTL field of the domain name record has not expired, generating and transmitting one or more DNS requests for the domain name information from one or more authoritative servers if the TTL field of the domain name record has expired, and if the one or more authoritative servers do not respond with the domain name information, generating and transmitting a DNS response to the client with information from the domain name record in the local cache having the expired TTL field.

In one embodiment a method of processing DNS requests includes storing subscriber information for a first client and a second client, receiving a request from the first client for domain name information of a first domain name, determining that a domain name record for the first domain name is expired and that one or more authoritative nameservers for the first domain name are unavailable, transmitting a first response with the domain name record to the first client in accordance with the subscriber information for the first client, and transmitting a second response without the domain name record to the second client in accordance with the subscriber information for the second client.

A method of processing domain name system requests in another embodiment includes monitoring one or more authoritative nameservers for one or more anomalies, the one or more authoritative nameservers containing domain name information for a first domain name, storing at a recursive nameserver a domain name record including at least portion of the domain name information for the first domain name, the domain name record including a TTL value, and in response to the one or more anomalies at the one or more authoritative nameservers, modifying the domain name record for the first domain name at the recursive nameserver.

In one embodiment, a method of processing domain name system requests includes storing at a recursive nameserver domain name information for a domain name, issuing a domain name system request to one or more authoritative nameservers for the domain name information after said storing, and modifying the domain name information at the recursive nameserver in response to a failure to receive a response to the DNS request from the one or more authoritative nameservers for the domain name.

In one embodiment, a method of processing domain name system requests includes storing at a recursive nameserver domain name information for a domain name using a first hashing parameter, issuing a domain name system request to one or more authoritative nameservers for the domain name after said storing, and storing the domain name information at the recursive nameserver using a second hashing parameter in response to a failure to receive a response from the one or more authoritative nameservers for the domain name information.

Other features, aspects, and objects of the disclosed technology can be obtained from a review of the specification, the figures, and the claims.

DETAILED DESCRIPTION

Figure 1:
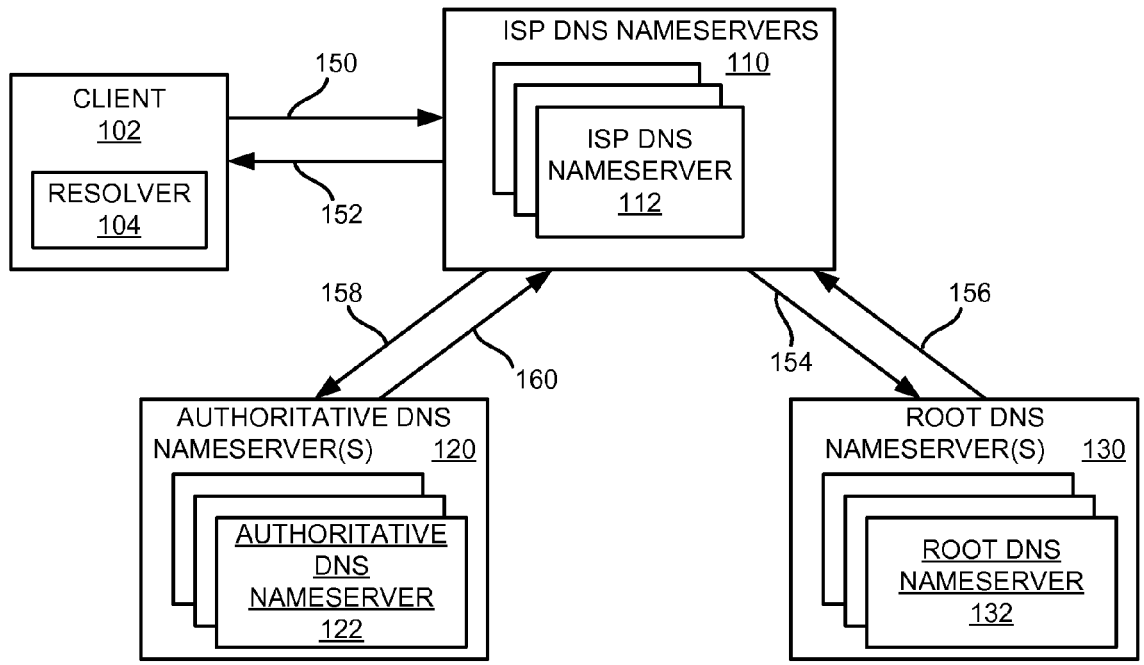
FIG. 1 is a simplified block diagram of a computer network depicting traditional processing of DNS requests.
Figure 2:
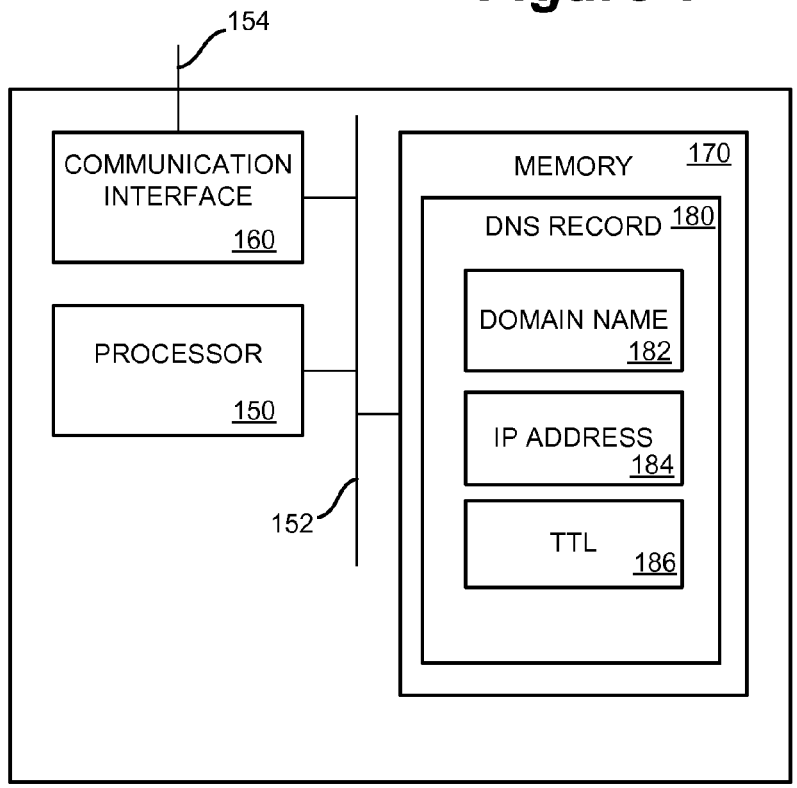
FIG. 2 is a simplified block diagram of an example of an authoritative DNS name server.

Embodiments in accordance with the presently disclosed technology provide improved domain name resolution in computing networks, such as where nameservers translate alphanumeric domain names into Internet Protocol (IP) addresses. One or more recursive DNS nameservers are configured to receive DNS requests from client devices for domain name information and resolve the requests into one or more IP addresses. The DNS nameservers utilize a local cache having previously retrieved domain name information to respond to requests when possible and in some instances, in accordance with an authorization or according to one or more preferences of the requesting entity.

When a DNS request is received by a DNS nameserver of one embodiment, the nameserver checks the local cache for a resource record corresponding to the requested domain name. If the TTL field for the corresponding resource record indicates the record is valid and not expired, the nameserver will generate a DNS response having the requested domain name information from the cache (e.g, IP address) and transmit that response to the requesting client device. If the domain name record is not in the cache, the nameserver will issue one or more DNS requests to one or more authoritative servers in order to retrieve the requested information. Once the nameserver recursively resolves the domain name into one or more IP addresses, it generates a DNS response and transmits that response to the requesting client device. If the domain name record is in the local cache but has an expired TTL, the nameserver issues one or more DNS requests to the authoritative server(s) for the requested domain name information and after receiving the information, generates a DNS response and transmits it to the requesting client.

It is possible for various failures to occur that may affect the ability of a recursive nameserver to retrieve the information needed to fulfill a DNS request. For example, an authoritative nameserver may be down or the connection to the nameserver may be down. A recursive nameserver may receive a server failure indication from an authoritative nameserver in response to a request or the authoritative nameserver may not reply, triggering a failure at the recursive nameserver after expiration of an allotted time period. Because the resolution process is recursive, a failure at any level (e.g, between the recursive nameserver and a root or other level authoritative nameserver) will cause the request to fail. Traditionally and according to the DNS protocol, a server failure (e.g., SERV-FAIL) DNS response is returned to the requesting client.

In accordance with one embodiment of the presently disclosed technology, a recursive DNS nameserver returns to the cache after being unable to retrieve the requested domain name information and accesses the resource record for the requested domain name. The nameserver will generate a DNS response to the client device that includes the domain name information from the cached resource record even though the record contains an expired TTL field.

To provide DNS resource records when the necessary authoritative nameservers are unavailable, the recursive nameservers maintain resource records having expired TTL fields in the cache. In the situation where a DNS request cannot be resolved due to the unavailability of one or more authoritative servers, the recursive nameserver can provide meaningful response data to requesting client devices.

Authoritative nameservers are monitored in one embodiment to detect anomalies such as the nameservers becoming unavailable. When it appears that one more nameservers being unavailable will interrupt the retrieval of requested DNS information, the recursive nameservers alter the cache and/or the caching mechanism to continue to be able to respond to requesting clients. The recursive nameserver determines the domains corresponding to the affected authoritative nameservers and any entries in the cache for those domains. The nameserver modifies the records in one example to indicate that they should not be deleted from the cache. In another example, the recursive nameserver changes the caching technique to avoid deleting corresponding entries.

In one example, the nameservers maintain subscriber information for requesting entities such as end-users, corporations, and the like. This subscriber information can be utilized with the local cache to provide user-configurable responses in these situations. For example, a subscribing entity may not want to receive domain name information from a record with an expired TTL field. A user preference setting can indicate whether or not to transmit expired data when a DNS request cannot otherwise be fulfilled. The nameserver accesses this information and provides a DNS response based on the particular user's subscriber settings. If the user has elected to receive data from expired records, the data from the expired record is provided. The subscriber settings may apply globally to all domain names or may be more granular to allow a user to specify that requests for some domain names may be fulfilled from expired records while requests for other domain names should not. If the user elects not to receive data from expired entries, either globally or for the particular information requested, the recursive nameserver responds with a server failure response in one embodiment. In another embodiment, the nameserver provides an IP address to the client corresponding to a web page with information explaining that they cannot fulfill the request with fresh data but can using expired data. A link to resolve the DNS request using the expired data can be provided in the web page. When a user selects the link, the nameserver will provide a DNS response from the expired record. Requesting client devices may also or alternatively provide preferences with or as part of DNS requests. A flag or other indication provided in a field of an individual DNS request can be accessed by the nameserver and used to tailor a response, as noted above. This setting can be used in conjunction with subscriber information. For instance, the information in a particular request can be used to override a user setting in the subscriber information or can be used when a user setting is not being stored.

Figure 3:
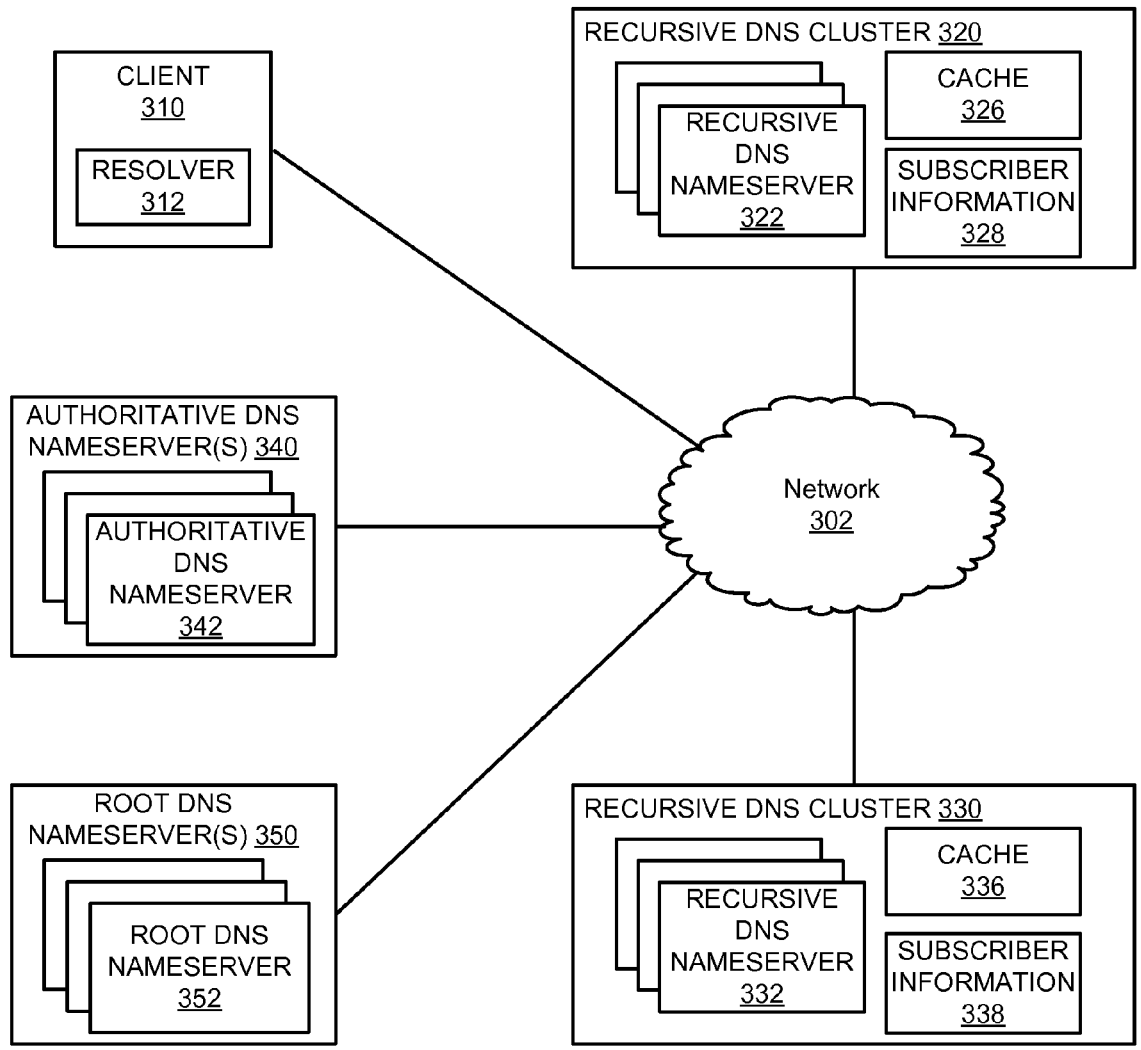
FIG. 3 is a simplified block diagram of a computing system including a recursive DNS nameserver in accordance with one embodiment of the disclosed technology.

FIG. 3 is a block diagram of a group of computing devices including recursive DNS nameservers in accordance with one embodiment of the presently disclosed technology. A client device 310, authoritative DNS nameservers 340, root DNS nameservers 350, and recursive DNS clusters 320, 330 are each in communication with a communications network 302, such as the Internet. The recursive DNS clusters can vary by implementation and include any suitable computing system such as a server, group, grid, or distributed platform of computer systems configured to respond to requests for domain name information. While each cluster in FIG. 3 is depicted with multiple recursive DNS nameservers (e.g, nameservers 322 in cluster 320), other embodiments may include a single computing system within a cluster such as a single server.

The individual recursive nameservers in a cluster, as well as the authoritative and root nameservers can be formed of hardware and/or software configured as described for domain name resolution. By way of non-limiting example, the various nameservers can include personal computers, servers, workstations, mainframes, etc.

In one example, the recursive DNS nameserver clusters 320, 330 are distributed in different physical, geographic, and/or network locations to resolve requests for domain name information (DNS requests) from other computer systems such as client 310. Different physical, geographic, and/or network locations may reduce latency and reduce response times for requests for domain name information. In other embodiments, the different clusters need not be distributed at different locations. Moreover, a single DNS cluster is provided in one embodiment. Each of the recursive DNS nameserver clusters 320, 330 can be assigned an anycast address in one example. Anycast is a network addressing and routing scheme that allows data to be routed to the "nearest" or "best" destination. The nearest or best destination is typically determined by routing topologies. For example, on the Internet, anycast is usually implemented by using routers that communicate with the Border Gateway Protocol (BGP) to simultaneously announce the same destination network address range from many different places on the Internet. Simultaneously announcing the same destination network address range results in packets addressed to anycast addresses in the destination network address range being routed to the "nearest" point or advertising router.

Typically, in anycast addresses, there is a one-to-many association between network addresses and network endpoints. Each destination address identifies a set of receiver endpoints, but one endpoint is generally chosen at any given time to receive information from a given sender. Anycast addresses may also include unicast, broadcast, and multicast addresses. Anycast is best suited to connectionless protocols (generally built on UDP such as the DNS protocol), although connection-oriented protocols such as TCP or UDP based protocols that keep their own state may be used.

Each of the recursive DNS nameservers in a cluster resolves requests for domain name information from other computing devices such as client 310. The nameservers in each cluster include or are in communication with a local cache 326, 336 and subscriber information 328, 338. In one example, each nameserver in a cluster provides part of the local cache for storing domain name information in that cluster. A portion of the local cache can be stored in each of the recursive DNS nameservers. In other examples, each nameserver can include an individual cache or a cache can be maintained independently of the nameservers.

The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

A response can also include a packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

Each nameserver can also provide all or part of the subscriber information for the cluster or independent storage can be used. The subscriber information 328, 338 in each cluster provides an indication to the recursive DNS servers of how to resolve requests for domain name information for different senders, owners, users, or subscribing entities associated with requests for domain name information. Examples of subscriber information include preferences, rules, policies, regular expressions, and the like. It is noted that the subscriber information can be omitted in some embodiments as described hereinafter.

In response to a DNS request for domain name information associated with a domain name, a recursive DNS nameserver within a cluster can determine a subscriber identifier. A subscriber identifier discriminates the sender, owner, user, or subscribing entity associated with the request for domain name information. Some examples of a subscriber identifier are IP addresses, userid's, and secure tokens. If an IP address identifier is used, the recursive DNS nameserver can inspect the network packet containing the request to determine the source IP address of the packet. A username or secure token may be included in the request for domain information from which the recursive DNS nameserver determines the subscriber identifier and the subscriber information.

The recursive DNS nameserver resolves a particular request for domain name information based on the subscriber information to generate a response in one embodiment. The recursive DNS nameserver then returns the response to the subscriber, providing the resolved domain name information in accordance with the subscriber information. By way of example, a substitute uniform resource locator (URL) that satisfies a substitution criterion for the domain name in the request for domain name information may be obtained, such as when the subscriber has indicated a preference to correct common misspellings in URL's. Other examples may include indicating that the address points to a suspicious site or a substituting an address for an IP address of a page with a warning and a link to retrieve the requested address. Another example can include resolving the request for domain name information based on the geographic location of the subscriber.

The cache 326, 336 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request.

When DNS requests from client 310 or other computing devices cannot be fulfilled with cached domain name information, the recursive DNS cluster initiates recursive processing to determine the needed information. For example, a DNS nameserver 322 may first issue a DNS request to one of the root servers 350 for generic top level domain information, followed by one or more DNS requests to various ones of the authoritative name servers 340 to determine the requested domain name information.

Figure 4:
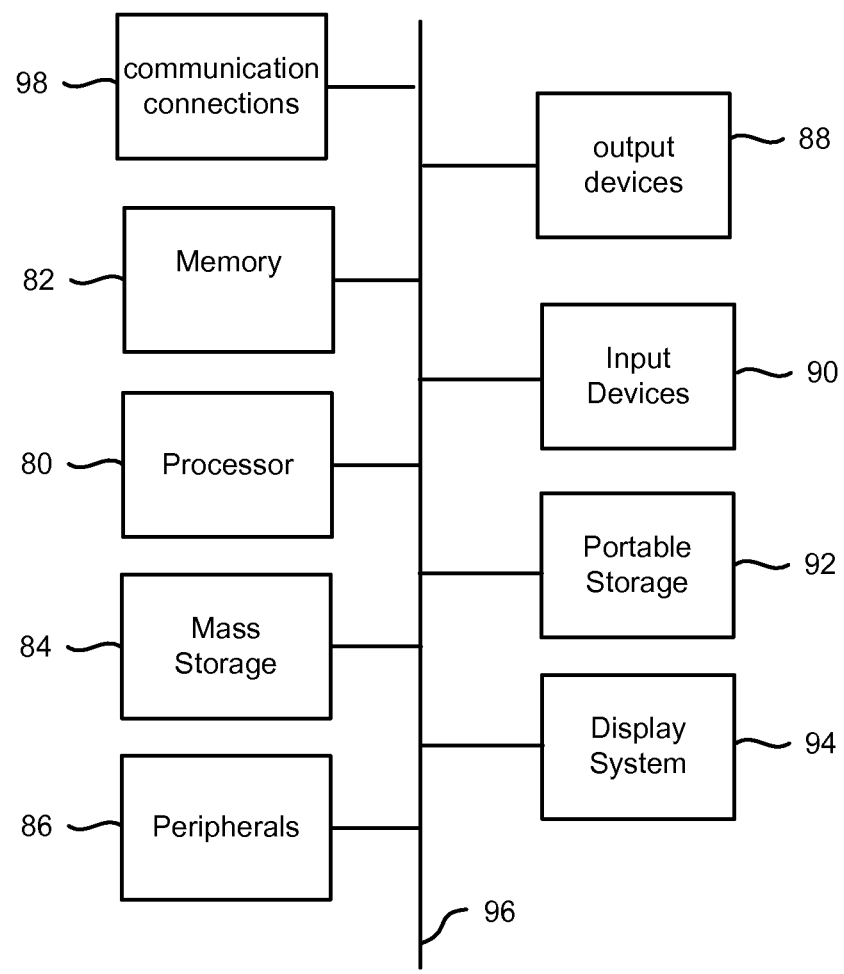
FIG. 4 is a simplified block diagram of a computing device that can be used to implement various embodiments of the disclosed technology.

FIG. 4 is a high level block diagram of a computing system which can be used to implement any of the computing devices of FIG. 3. The computing system of FIG. 4 includes processor 80, memory 82, mass storage device 84, peripherals 86, output devices 88, input devices 90, portable storage 92, and display system 94. For purposes of simplicity, the components shown in FIG. 4 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 4. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 4 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 4 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein can be implemented using hardware, software, or a combination of both hardware and software. The software used is stored on one or more of the processor readable storage devices described above to program one or more of the processors to perform the functions described herein. In alternative embodiments, some or all of the software can be replaced by dedicated hardware including custom integrated circuits, gate arrays, FPGAs, PLDs, and special purpose computers.

Figure 5:
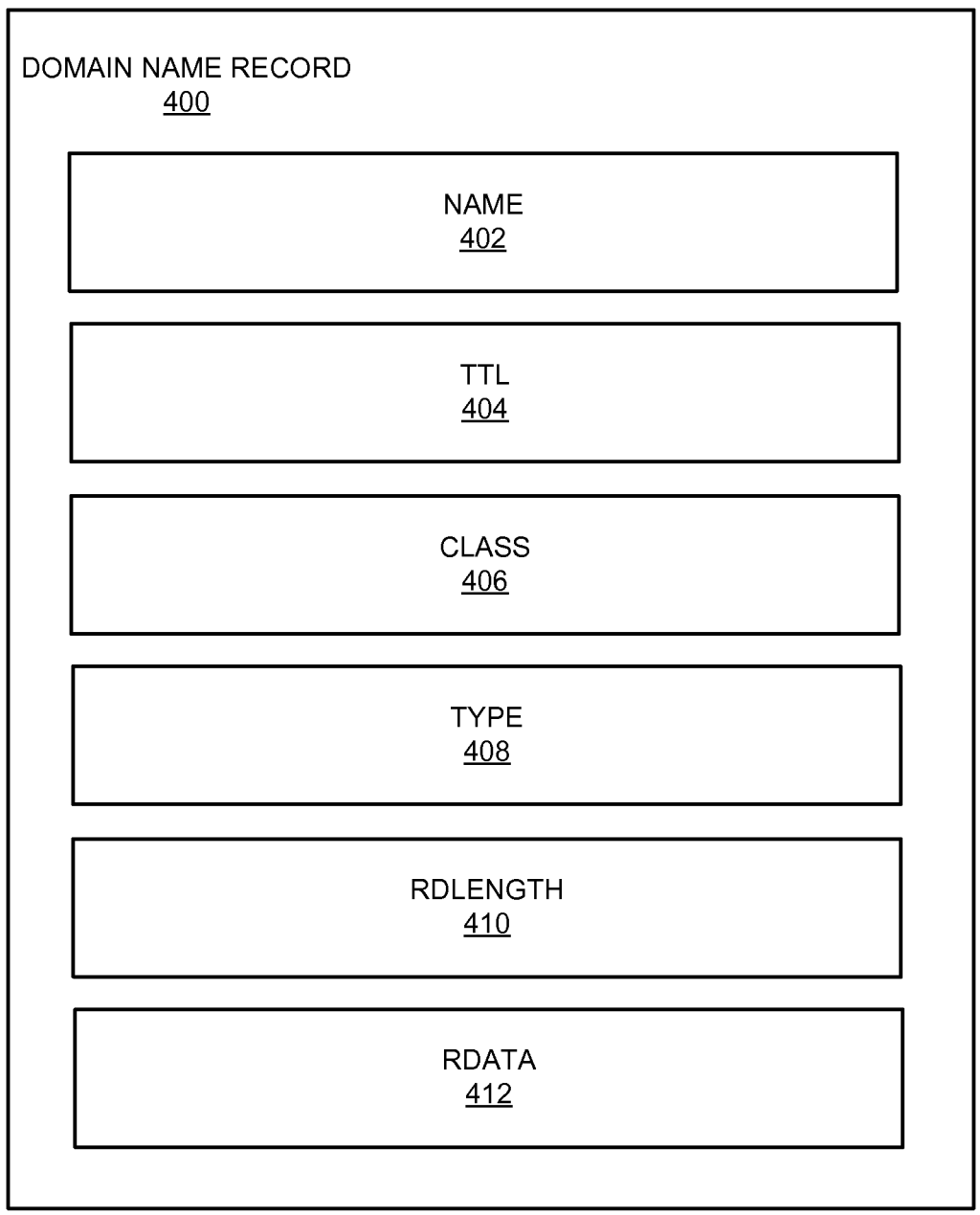
FIG. 5 depicts the structure of a DNS resource record.

FIG. 5 is a block diagram depicting the structure of a domain name resource record that can be stored in the local cache 326, 328 at the recursive DNS clusters. Each resource record includes a name field 402, a TTL field 404, a class field 406, a type field 408, an RDLENGTH field 410 and an RDATA field 412. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 6:
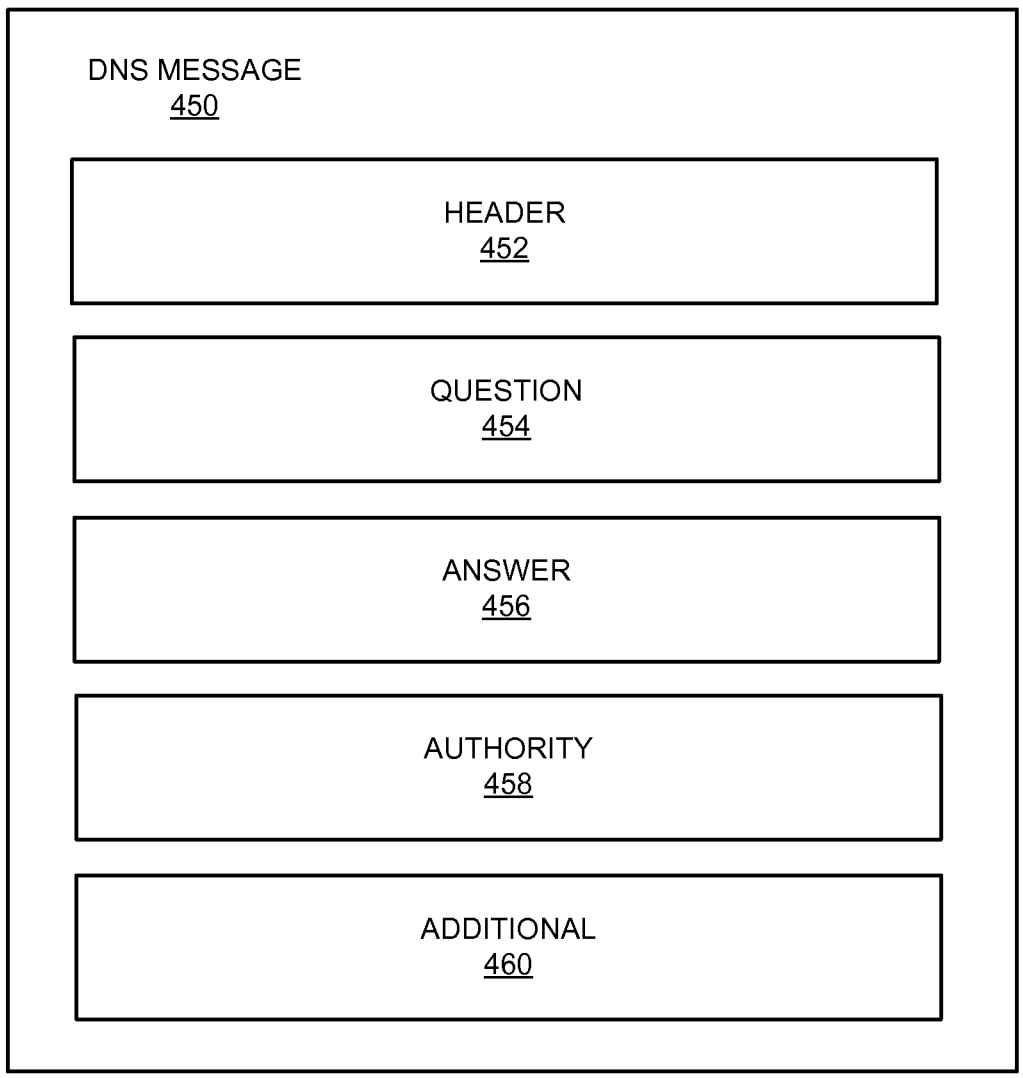
FIG. 6 depicts the structure of a DNS message.

FIG. 6 is a block diagram depicting the structure of a DNS message response or request 450. A DNS message includes a header field 452, a question field 454, an answer field 456, an authority field 458 and an additional field 460. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information. In accordance with one embodiment of the present disclosure, the additional field in DNS requests is used to facilitate various functions such as determining client identities and indicating user preferences. For example, a userid can be included by a client device in one example so that the recursive DNS nameserver can lookup the client's subscriber information 328, 338 to obtain user preferences, etc. Additionally, user preferences can be set directly by asserting specified bits in the additional field in one embodiment. For example, a user may assert a bit to indicate that it wishes to receive expired domain name information if current information is not available. A user or resolution preference can include any information supplied by a user that indicates to the recursive DNS nameserver how to resolve and/or generate a response to requests for domain name information.

In general, an extension of the DNS protocol called EDNS allows more flags, label types and return codes to be defined. EDNS may allow the sender of a DNS message (e.g., client 310) to advertise its own extended capabilities to the message receiver (e.g., DNS nameserver 320). This may accomplished through the inclusion of an OPT pseudo resource code (pseudo-RR) in the additional data section of a request or response. (An OPT is called a pseudo-RR because, unlike other RR types, it contains no actual DNS data. Instead, it encodes information about its sender.)

In various embodiments, client 310 defines a new type of pseudo-RR, (e.g., called vendor OPT or VOPT), for control of device or vendor-specific DNS server behavior. The VOPT record may appear in the additional data section of a request. In general, a VOPT field applies to the DNS request that it accompanies. This allows a per-request control of each DNS message.

In one embodiment, the general structure for VOPT is as follows:

| Field Name | Field Type | Description |
| --- | --- | --- |
| NAME | domain name | empty (root domain) |
| TYPE | u_int16_t | VOPT |
| CLASS | u_int16_t | vendor ID |
| TTL | u_int32_t | vendor specified |

-continued

| Field Name | Field Type | Description |
|---|---|---|
| RDLEN | u_int16_t | length of RDATA |
| RDATA | octet stream | vendor specified |

In various embodiments, an organization associated with a DNS nameserver 320 may provide fixed values for the TYPE and CLASS fields (i.e., VOPT and vendor ID). The organization may also provide several values for the TTL field, each corresponding to a particular level of DNS control (e.g., level of adult site blocking, level of malicious web site detection, etc.).

Figure 7:
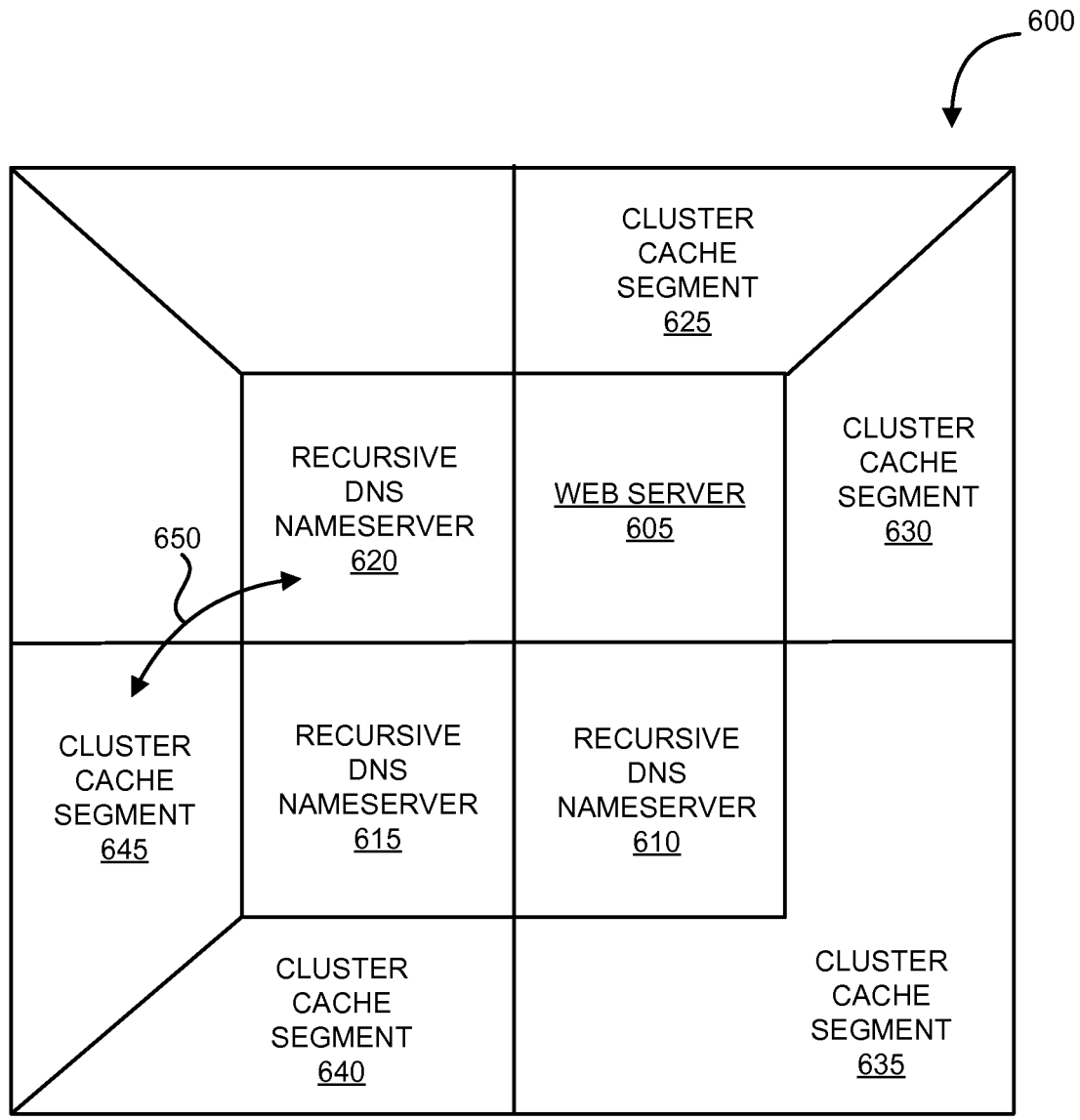
FIG. 7 is a simplified block diagram of a cache in accordance with one embodiment.

FIG. 7 is an illustration of the composition of a local cache 600 used by a recursive DNS cluster in one example. In the illustrated embodiment, a portion of the local cache 600 is distributed in RAM of a web server 605, and recursive DNS nameservers 610, 615, and 620. The web server 605 includes cluster cache segments 625 and 630. The recursive DNS nameserver 610 includes a cluster cache segment 635. The recursive DNS nameserver 615 includes cluster cache segments 640 and 645. The recursive DNS nameserver 620 does not include any cluster cache segments (represented by the blank segments).

The web server 605 and each of the recursive DNS nameservers 610, 615, and 620 have read/write access to any portion of the cluster cache segments 625, 630, 635, 640, and 645 hosted by the web server 605 and/or the recursive DNS nameservers 610, 615, and 620. In this example, the recursive DNS nameserver 620 performs an access operation 650 (such as a read or write operation) in the cluster cache segment 645 hosted by the recursive DNS nameserver 615.

Other hardware and software configurations are suitable for implementing the cache. For example, the local cache may be in RAM of a single host computer providing access to one on or more virtual recursive DNS nameservers executing on the host computer system. In some embodiments, the cluster cache segments 625, 630, 635, 640, and 645 are stored in a storage area network (SAN) or in network-attached storage (NAS).

Moreover, the relationship between recursive DNS nameserver instances and cluster cache segments does not have to be one-to-one as illustrated in FIG. 7. In some embodiments, there are more cluster cache segments than recursive DNS nameservers. In other embodiments, there may be more recursive DNS nameservers than cluster cache segments. Additionally, the cluster cache segments are not limited to being hosted or stored in the recursive DNS nameservers.

Accordingly, in some embodiments, a portion of the local cache 600 can be replaced, or pre-loaded with domain name information. For example, if the recursive DNS nameserver 615 needs to go off-line for a scheduled maintenance or upgrade, the cluster cache segments 640 and 645 managed by the recursive DNS nameserver 615 can be backed up to a disk or tape drive. While the recursive DNS nameserver 620 is offline, the portion of the local cache 600 managed by the recursive DNS nameserver 620 is temporarily unavailable. When the recursive DNS server 620 goes online again, the backup is restored to the cluster cache segments 640 and 645 managed by recursive DNS nameserver 620. Additionally, the cluster cache segments 640 and 645 managed by the recursive DNS nameserver 615 may be transferred to the recursive DNS nameserver 620 to avoid any unavailability of domain name information.

In various embodiments, the computer systems that form the local cache 600 or other cache management systems perform one or more actions to ensure freshness of records and consistency of data in the local cache 600. In one example, the recursive DNS nameserver 610 proactively retrieves domain name information for domain name records before they expire. The recursive DNS nameserver 610 then refreshes the records in the local cache 600 which further removes latency involved when a user or subscriber requests an expired domain name record. The recursive DNS nameserver 610 may pre-fetch all or a portion of the locally cached domain name records. In some embodiments, the recursive DNS nameserver 610 tracks the "popularity" of domain name records. The recursive DNS nameserver 610 pre-fetches those domain name records with a higher popularity. This may be performed in real-time, such as using counter information associated with domain name record. The recursive DNS nameserver 610 may also analyze and parse log records to determine statistics for pre-fetching.

Figure 8:
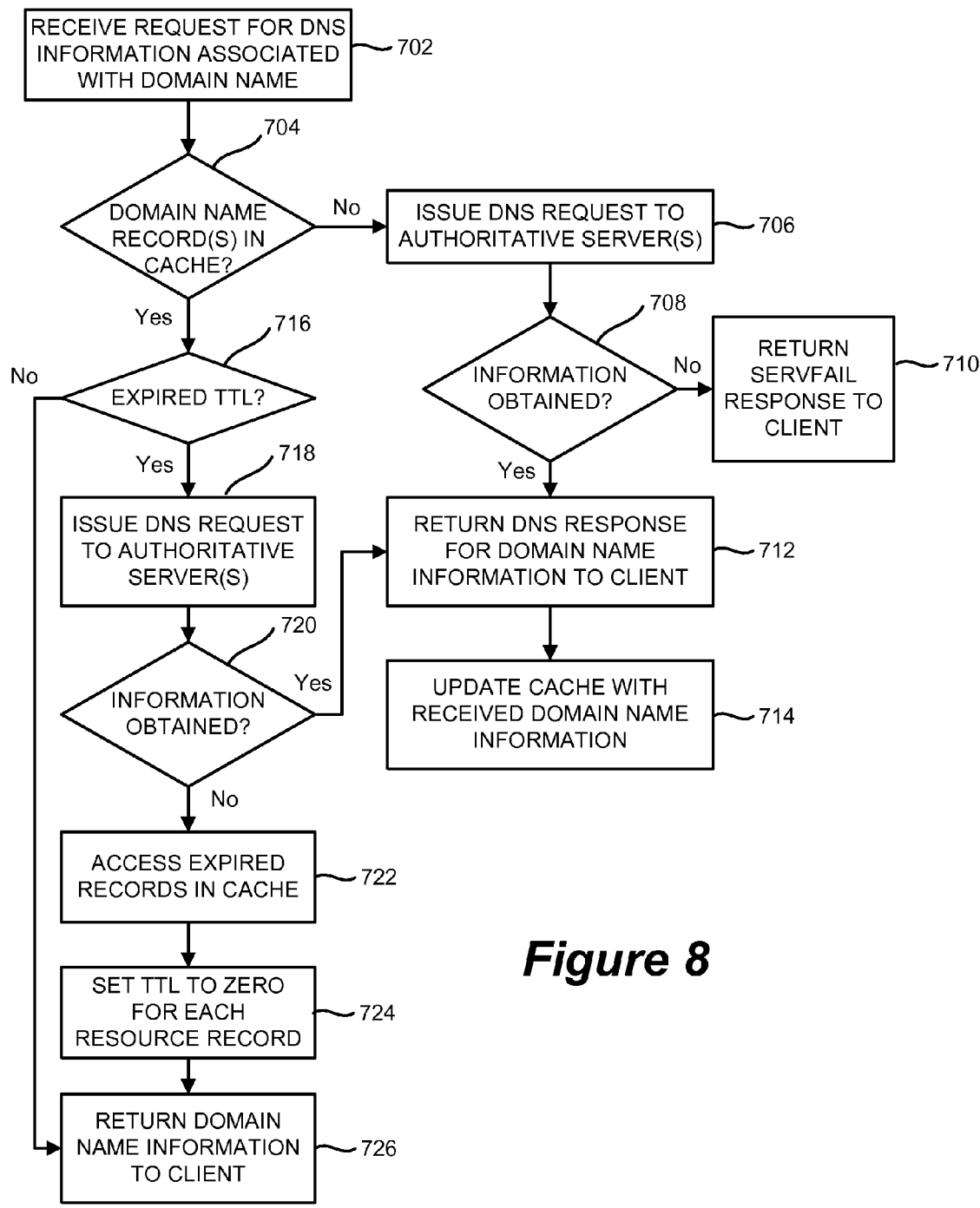
FIG. 8 if a flowchart describing a DNS resolution process in accordance with one embodiment.

FIG. 8 is a flowchart describing processing of a DNS request by a recursive DNS nameserver in accordance with one embodiment of the present disclosure. The DNS nameserver (e.g., nameserver 322) receives a request for domain name information associated with a domain name at step 702. The nameserver first checks the local cache at step 704 to determine whether it is storing the necessary domain name records for the requested domain name. Some DNS requests may require multiple domain name records or multiple domain name record sets in order to complete a request, such as when a CNAME alias domain name DNS request is received. A resource record set refers to a set of resource records that each satisfy a query, such as when multiple IP addresses are returned for various nameservers that can be accessed to determine the same domain name information.

If the domain name record is not in the cache, the recursive DNS nameserver issues a DNS request for the requested domain to the authoritative server(s) at step 706. As earlier described, the process at step 706 may involve multiple recursive DNS requests in order to determine the final IP address. At step 708 the DNS nameserver 320 determines whether it has been able to retrieve the requested domain name information. The nameserver may not be able to obtain the information if any step in the recursive process fails. A particular authoritative nameserver may not respond within the allotted time period or may issue a server failure response to the recursive DNS nameserver 320. The nameserver will try all available nameservers to satisfy the step before determining that the information cannot be obtained. If the information is not obtained, the nameserver returns a server failure response to the client at step 710.

If the recursive DNS nameserver obtains the information, it generates a DNS response to the client at step 712, including the requested domain name information. At step 714, the local cache is updated to include the recently received domain name information. Step 714 may include applying a hash algorithm to the domain name record (e.g., using the domain name as a key) to determine a unique hash value. In a particular example, an entry having the same hash value can be deleted from the cache and the new domain name record created and stored in its place.

If the recursive DNS nameserver determines that the requested domain name record(s) is present in the cache (step 704), it checks the TTL field for the resource record at step 716. If the TTL has expired, the nameserver issues the DNS request to the necessary authoritative servers at step 718. At step 720, the nameserver determines whether it has been able to retrieve the requested domain information. If the nameserver has retrieved the requested information, a DNS response is returned to the client at step 712.

If the nameserver cannot retrieve the requested information, it accesses the resource record(s) in the cache at step 722 to fulfill the DNS request despite the unavailability of one or more of the necessary authoritative nameservers. After retrieving the cached domain name information, the nameserver sets the TTL for each record to zero at step 724. By setting the TTL to zero, the recursive DNS nameserver indicates to the receiving entity that the domain name information should only be used once, and not reused for future DNS requests. After setting the TTL fields in each record to zero, the DNS nameserver returns the requested domain name information to the client at step 726.

In one embodiment, the system provides an indication to the client device when providing information from an expired domain name record. This can include setting a value or flag in an options or other field of the DNS response. The client can be configured to recognize the value or flag as indicating the information is from an expired record.

In one embodiment, when any resource record in a set has an expired TTL, the nameserver automatically returns all records for the request from the cache without regard to their TTL status or whether the information can be obtained from an authoritative nameserver. For example, the system can return the information for an actual domain name from the cache after determining that a resource record for a requested CNAME alias is expired.

In another embodiment, the system uses cached information to continue a recursive query that would otherwise stop due to a server failure or timeout at an intermediate processing step. For example, after determining that an alias record and the corresponding actual domain record are expired, the system uses the cache to get the location of the nameserver(s) for the actual domain name. Using the cached alias information, the system issues a request to the authoritative nameserver(s) for the actual domain name information. In this manner, the system continues the recursive request process even when one or more intermediate records are unavailable.

Figure 9:
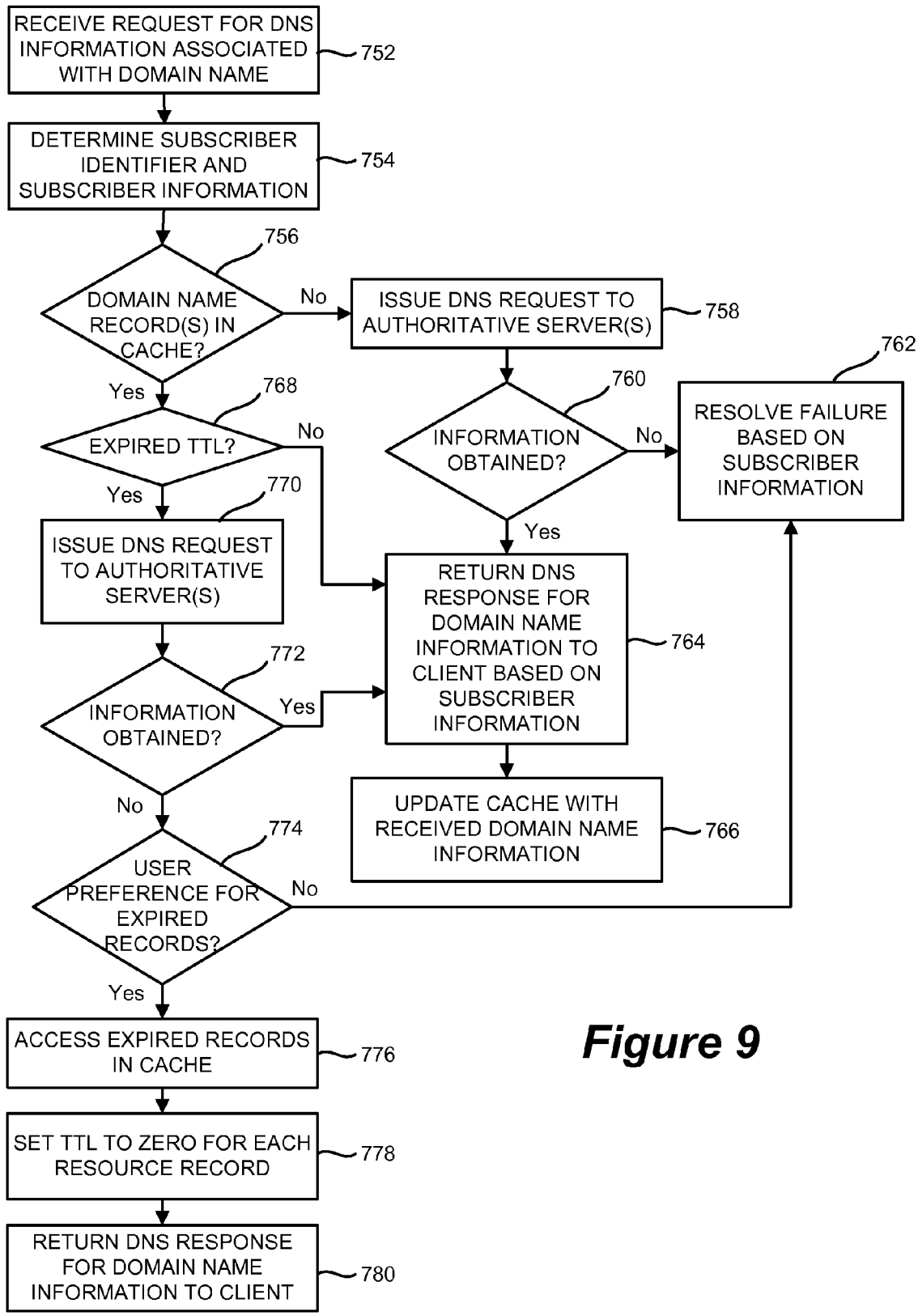
FIG. 9 is a flowchart describing a DNS resolution process in accordance with another embodiment that includes processing subscriber information to resolve domain name information.

FIG. 9 is a flowchart describing processing of a DNS request in another embodiment that includes using subscriber information as part of the domain name resolution process. The nameserver receives a DNS request at step 752. At step 754, the nameserver determines the subscriber identifier corresponding to the requesting client and the subscriber information, if any, associated with that client. As earlier described, IP addresses, security tokens, userid's as well as other subscriber identifiers can be used. In some implementations, the nameserver can cycle through various identifiers to attempt to identify the client. For example, the nameserver may first check for a userid included in the DNS request, then for a security token, and lastly at the IP address to identify the client. Other techniques can be used as well. After determining the subscriber identifier, the corresponding subscriber information is accessed. If the subscriber information is included in the DNS request or with the DNS request, such as in flags in the additional field of the DNS request, the nameserver does not necessarily have to determine a subscriber identifier and then look up subscriber information.

At step 756, the nameserver checks the local cache for domain name resource records to fulfill the DNS request. If the cache is not maintaining the corresponding records, the nameserver initiates a recursive resolution process and issues one or more DNS requests at step 758. If the nameserver has obtained the domain name information as determined at step 760, it generates and returns a response to the client device at step 762. Step 762 can include processing any domain name record flags in accordance with the resolution preferences in the subscriber information. For example, the nameserver may determine whether the domain name record contains a phishing flag indicating that the site appears suspicious, untrustworthy or requests personal or confidential information. The nameserver may determine whether the record contains other flags, such as those indicating the domain is not to be provided to the requesting client because it is in a category of prohibited domains such as social networking, etc. After checking the domain name record, the nameserver checks the user's preferences in the subscriber information to resolve the address. For example, the user may have a preference that when the phishing flag is set, for the nameserver to provide a substitute domain name or URL that redirects the user to a different site or domain name. For example, the nameserver may generate substitute domain name information that points to a warning page or other desired information. The user may alternately have a preference to receive a warning concerning domains with a phishing flag. The nameserver may provide a DNS response having warning information in the additional field or redirect the user to an address containing a warning page with a link to the originally requested domain name. The user could further elect to completely block access to such domains and never return domain name information or could elect to proceed normally to the domain. After returning a DNS response, the nameserver updates the local cache at step 766.

If the nameserver determines that the information is not in the cache for generating a DNS response, it resolves the failure condition at step 762 based on the subscriber information. For example, the nameserver may determine whether the domain name in the DNS request is recognized, for example, as a misspelled, malformed, or unregistered domain name having no domain name information. The user may set a preference to correct such misspellings and the like. If the preference is set, the nameserver can first identify the proper domain name corresponding to the inaccurate domain name. The nameserver may check a database or other data structure containing a mapping of common misspellings and their corresponding proper domain names. The nameserver can then return to step 756 to check for the information in the cache corresponding to the proper domain name and continue as will be described. The user may also elect to be redirected to a search page having links to possible domain names the user intended. The nameserver can redirect the user by placing the IP address of the search page in the DNS response.

If the domain name record(s) is in the cache, the nameserver checks whether the TTL field for the record has expired at step 768. If not, the nameserver generates a DNS response and transmits it to the client at step 764 as just described. Step 776 is not performed to update the cache in this case. If the TTL has expired, the nameserver issues one or more DNS requests to authoritative nameservers at step 770. If the nameserver receives the information to respond to the client, it again proceeds to step 764 to generate and transmit a DNS response. At step 766, the cache is updated with the received domain name information. If the nameserver is unable to retrieve the requested information it checks the subscriber information for the client at step 774. If the client has set a user preference to receive expired domain name information, the nameserver proceeds by accessing the expired records at step 776 and setting the TTL of the domain name records to zero at step 778. The nameserver then generates a DNS response containing the domain name information from the expired entry and transmits it to the client at step 780. If the client has set a user preference to not receive expired domain name information, the nameserver resolves the failure condition at step 762. In addition to or in place of checking the subscriber information, the nameserver can determine a user preference from information in the DNS request.

Figure 10:
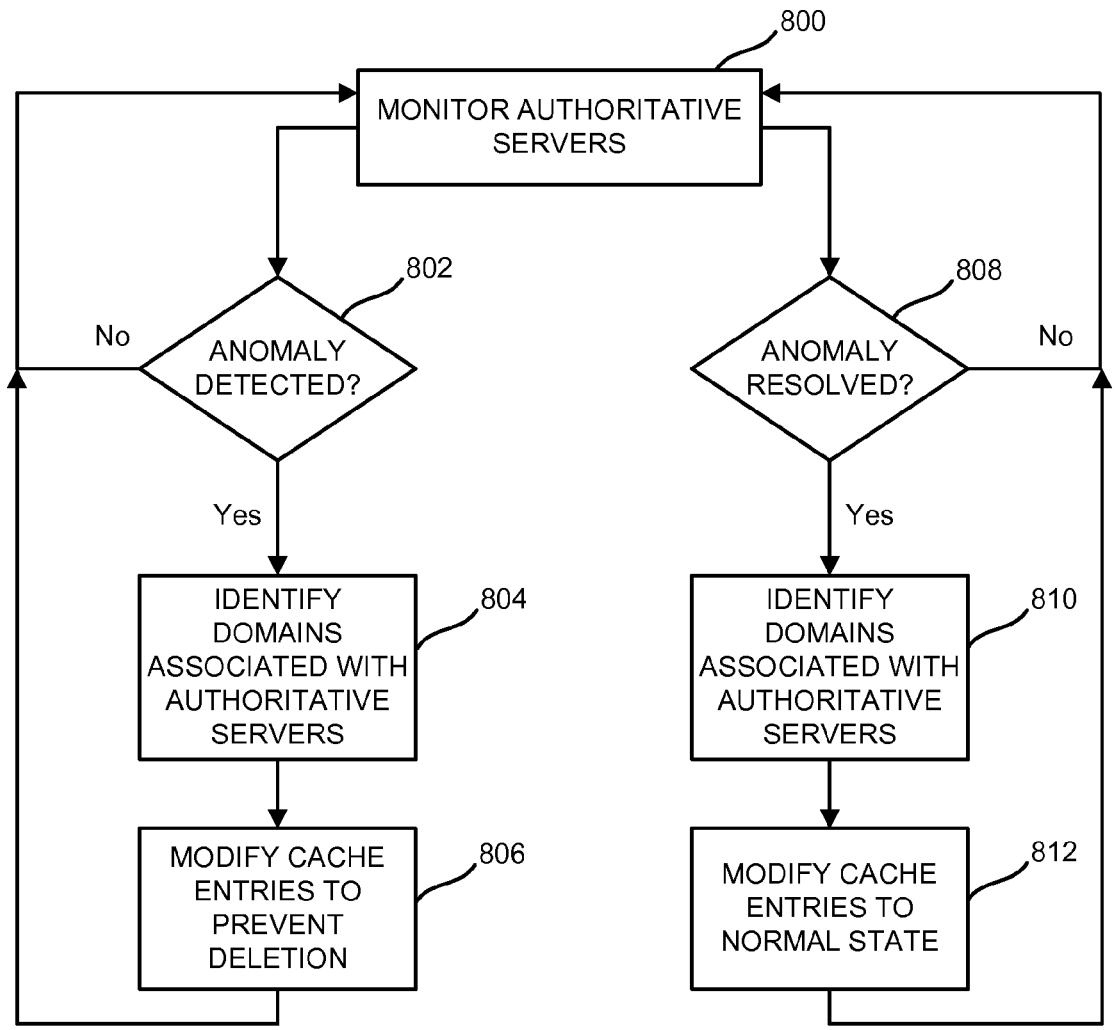
FIG. 10 is a flowchart describing a process for monitoring authoritative name servers to modify a DNS record cache and/or caching algorithm based on detected anomalies.

The recursive DNS nameservers in one embodiment are configured to selectively maintain domain name records in select instances when certain criteria are met. FIG. 10 is a flowchart describing a monitoring and cache modification process in one embodiment. At step 800, one or more authoritative servers are monitored. Step 800 can be performed manually by human operators observing network traffic and responses in one example. In another example, the DNS nameservers or other computing devices are configured to monitor the authoritative nameservers. The monitoring process can attempt to be inclusive of all authoritative nameservers or can be restricted to select authoritative servers.

Step 800 is performed continuously in one embodiment as indicated by the recursive arrows in steps 802 and 808. The nameservers either check for a detected anomaly or can receive notifications of a detected anomaly. Various detections can be performed. The authoritative nameservers can be observed for repetitive server failure responses to identify that a server has become unavailable or that the server is not handling traffic well. The monitoring process may also access public records or be responsive to human input identifying an anomaly. The monitoring process may be configured to respond to various levels of anomalies. For instance, if it is known that a group of authoritative servers all serve a particular domain, an anomaly indication may be triggered when any one server becomes unavailable or when a predetermined number or percentage of the servers become unavailable. If an anomaly is detected at step 802, the recursive nameservers identify any domains at step 804 for which the serving authoritative nameservers have an indicated anomaly. For those domains, the nameservers modify the cache entries to prevent deletion at step 806. In one example, the nameservers set a flag in the domain name records indicating that the record should not be deleted. This flag can override any default settings to delete records. For example, in closed addressing based hashing algorithms, a record may be deleted when a more recent record hashes to the same key. By setting the flag, the record can be maintained. In one embodiment, the nameservers changes one or more hashing parameters when an anomaly is detected. A closed addressing based hashing algorithm may changed in favor of a open addressing based technique when an anomaly is detected so that records are not overwritten and remain in the cache. For example, a chaining technique can be applied to skip to alternate locations when collisions occur in the hash table. This can employed independently or in conjunction with altering resource records in the cache.

After an anomaly is detected, the monitoring process continues at step 800 and step 808 to determine when the anomaly has been resolved. For example, the monitoring process can monitor the unavailable nameservers by issuing DNS requests to determine when they have come back online. When a previously detected anomaly is resolved as determined at step 808, the recursive nameservers identify the modified cache entries at step 810 and restore the cache entries to their normal state at step 812, allowing them to be processed as other resource records.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method of processing domain name system (DNS) requests, comprising:
   receiving at a recursive nameserver a request from a client for domain name information associated with a domain name;
   determining whether a local cache contains a domain name record corresponding to the domain name;
   if the local cache contains the domain name record corresponding to the domain name, determining whether the domain name record is expired;
   in response to determining that the domain name record is expired, issuing one or more requests for the domain name information to one or more authoritative name servers; and
   if the domain name information is not received from the one or more name nameservers, accessing subscriber information for the client;
   if the subscriber information indicates a preference not to receive expired domain name information, transmitting a DNS response to the client indicating a failure to obtain information for the domain name; and
   if the subscriber information indicates a preference to receive expired domain name information, transmitting a DNS response to the client that includes information from the expired domain name record.

2. The method of claim 1, further comprising:
   obtaining the domain name record from the local cache if the domain name information is not received from the one or more nameservers;
   setting a time-to-live (TTL) value in the domain name record to zero; and
   wherein transmitting the DNS response to the client that includes information from the expired domain name record includes transmitting the domain name record to the client.

3. The method of claim 1, wherein:
   the domain name record includes an internet protocol (IP) address associated with the domain name.

4. The method of claim 3, wherein the IP address indicates a physical address for the domain name.

5. The method of claim 1, wherein the client is a first client and the request is a first request, the method further comprising:
   transmitting the DNS response to the first client with information from the expired domain name record in response to the subscriber information for the first client;
   receiving at the recursive nameserver a second request from a second client for domain name information associated with the domain name;
   accessing subscriber information associated with the second client; and
   providing a response to the second client indicating that the domain name information cannot be resolved in response to the subscriber information for the second client.

6. The method of claim 5, wherein:
   the subscriber information for the first client contains one or more resolution preferences; and
   the subscriber information for the second client contains one more resolution preferences.

7. The method of claim 6, further comprising:
transmitting a notification to the first client that the domain name information is expired.

8. The method of claim 7, wherein the notification is part of the response.

9. The method of claim 7, further comprising:
generating the DNS response to include an IP address for a server providing a web page containing the notification and a link to an IP address for the domain name.

10. The method of claim 1, further comprising:
associating a flag with the domain name record in the local cache; and
generating the DNS response in accordance with the flag and one or more user preferences.

11. The method of claim 1, further comprising:
detecting one or more anomalies associated with the one or more authoritative nameservers; and
modifying at least one domain name record in the local cache in response to detecting the one or more anomalies.

12. The method of claim 11, wherein modifying the at least one domain name record includes setting a flag in the domain name record indicating the domain name record should not be deleted.

13. The method of claim 1, further comprising:
determining that the domain name information has not been received from the one or more authoritative nameservers in response to a server failure response from the one or more authoritative nameservers or in response to an expiration of an allotted time period for receiving the domain name information from the one or more authoritative nameservers.

14. A system for processing domain name system requests, comprising:
a communications interface configured to exchange data with a communications network;
a local cache configured to store domain name information for domain names;
one or more processors in communication with the communications interface and the local cache, the one or more processors configured to process a request for domain name information associated with a domain name by determining whether the local cache contains the requested domain name information in a domain name record, generating and transmitting a DNS response to the client with information from the domain name record in the local cache if a TTL field of the domain name record has not expired, generating and transmitting one or more DNS requests for the domain name information from one or more authoritative servers if the TTL field of the domain name record has expired, and if the one or more authoritative servers do not respond with the domain name information, accessing subscriber information for the client, generating and transmitting a DNS response to the client indicating a failure to obtain information for the domain name if the subscriber information indicates a preference not to receive expired domain name information, and generating and transmitting a DNS response to the client with information from the domain name record in the local cache having the expired TTL field if the subscriber information indicates a preference to receive expired domain name information.

15. A system according to claim 14, wherein:
the local cache is stored in a cluster of recursive nameservers.

16. A system according to claim 15, wherein:
the cluster of recursive nameservers includes a first nameserver and a second nameserver, the first recursive nameserver stores a first cluster cache segment and the second nameserver stores a second cluster cache segment.

17. One or more processor readable storage devices having processor readable code stored thereon, the processor readable code programs one or more processors to perform a method comprising:
receiving at a recursive nameserver a request from a client for domain name information associated with a domain name;
determining whether a local cache contains a domain name record corresponding to the domain name;
if the local cache contains the domain name record corresponding to the domain name, determining whether the domain name record includes an expired TTL value;
in response to an expired TTL value, issuing one or more requests for the domain name information to one or more authoritative name servers; and
if the domain name information is not received from the one or more name nameservers, accessing subscriber information for the client;
if the subscriber information indicates a preference not to receive expired domain name information, transmitting a DNS response to the client indicating a failure to obtain information for the domain name; and
if the subscriber information indicates a preference to receive expired domain name information, transmitting a DNS response to the client that includes information from the domain name record having an expired TTL value.

18. One or more processor readable storage devices according to claim 17, wherein the client is a first client and the request is a first request, the method further comprising:
determining from the subscriber information for the first client that the first client wants to receive information from domain name records having an expired TTL value;
transmitting the DNS response to the first client with information from the domain name record having the expired TTL value in response to the subscriber information for the first client;
receiving at the recursive nameserver a second request from a second client for domain name information associated with the domain name;
determining that the local cache contains the domain name record corresponding to the domain name and that the domain name record includes an expired TTL value;
issuing one or more requests for the domain name information to the one or more authoritative servers in response to the second request and determining that the domain name record contains an expired TTL value;
accessing subscriber information associated with the second client;
determining from the subscriber information for the second client that the second client does not want to receive information from domain name records having an expired TTL value; and
providing a response to the second client indicating that the domain name information cannot be resolved.

19. One or more processor readable storage devices according to claim 18, further comprising:
transmitting a notification to the first client that the domain name information includes information from a domain name record having an expired TTL value.

20. A computer program product embodied on a non-transitory computer readable medium containing instructions executable by one or more processors, the executable instructions comprising:
- code for determining whether a local cache contains requested domain name information in a domain name record;
- code for generating and transmitting a DNS response to a client with information from the domain name record in the local cache if the domain name record is not expired;
- code for generating and transmitting one or more DNS requests for the domain name information to one or more authoritative servers if the domain name record is expired;
- code for accessing subscriber information for the client if the one or more authoritative servers do not respond with the domain name information;
- code for transmitting a DNS response to the client indicating a failure to obtain information for the domain name if the subscriber information indicates a preference not to receive expired domain name information; and
- code for generating and transmitting a DNS response to the client with information from the expired domain name record if the subscriber information indicates a preference to receive expired domain name information.

* * * * *